(12) United States Patent
McKay

(10) Patent No.: US 6,808,324 B2
(45) Date of Patent: Oct. 26, 2004

(54) IMAGE STABILIZATION AND BALANCING SYSTEM

(76) Inventor: Thomas L. McKay, 11339 Taylor Draper Lne, Austin, TX (US) 78759

( * ) Notice: Subject to any disclaimer, the term of this patent is extended or adjusted under 35 U.S.C. 154(b) by 0 days.

(21) Appl. No.: 10/386,128

(22) Filed: Mar. 12, 2003

(65) Prior Publication Data

US 2004/0179835 A1 Sep. 16, 2004

(51) Int. Cl.$^7$ .............................................. G03B 17/00
(52) U.S. Cl. ...................................................... 396/421
(58) Field of Search ................................. 396/419–421

(56) References Cited

U.S. PATENT DOCUMENTS

| | | |
|---|---|---|
| 4,946,272 A | 8/1990 | Brown |
| 5,098,182 A | 3/1992 | Brown |
| D329,449 S | 9/1992 | Brown et al. |
| 5,229,798 A | 7/1993 | Brown |
| 5,243,370 A * | 9/1993 | Slater .......................... 352/243 |
| D358,832 S | 5/1995 | Lenney et al. |
| 5,585,849 A | 12/1996 | Robalino |
| 5,650,821 A | 7/1997 | Hewlett |
| 5,742,859 A * | 4/1998 | Acker .......................... 396/419 |
| 5,963,749 A | 10/1999 | Nicholson |
| 6,149,112 A | 11/2000 | Thieltges |
| 6,188,849 B1 | 2/2001 | Staicouras |
| 6,293,676 B1 | 9/2001 | Holway |
| 6,554,500 B2 | 4/2003 | Melitopoulos |
| 6,578,967 B1 | 6/2003 | Paddock et al. |
| 2002/0001470 A1 | 1/2002 | Linnecke |
| 2002/0090216 A1 | 7/2002 | Melitopoulos |
| 2003/0147641 A1 | 8/2003 | Haney |

OTHER PUBLICATIONS

Glidecam 200 Pro–Camera Stabilization, pp. 1–6, Oct. 29, 2003.
Steadicam Jr., Set–up Guide, Tiffen Company, LLC, Jun. 1990.

* cited by examiner

Primary Examiner—David M. Gray
(74) Attorney, Agent, or Firm—Jacobson Holman PLLC

(57) ABSTRACT

An image stabilization system for use with a camera by a camera operator. The stabilization system includes a body member having a generally C-shape with a first end at one end of the C-shape and a second end at the other end of the C-shape with a top portion at the first end of the C-shape and a bottom portion at the second end of the C-shape. A monopod, made up of a plurality of elongated sections arranged in a telescopic manner to extend the length of the monopod, is operatively secured to the bottom of C-shape. An adjustable camera mounting plate is secured to the body member. An elongated handle is secured to the body member by a universal joint for movably securing a first end of the handle member to the body member so that the handle member is movable in all directions. Weights may be secured to the body member to balance a camera on the mounting plate so that the camera is stabilized when the stabilization device is moved in any direction. The handle member may be secured to the body member so that the system can be used as a monopod. The camera can also be mounted to the bottom of the monopod in order to provide stabilized shooting while to camera is moving near the ground and the camera operator observes the action on a screen attached to the top of the stabilization device.

11 Claims, 9 Drawing Sheets

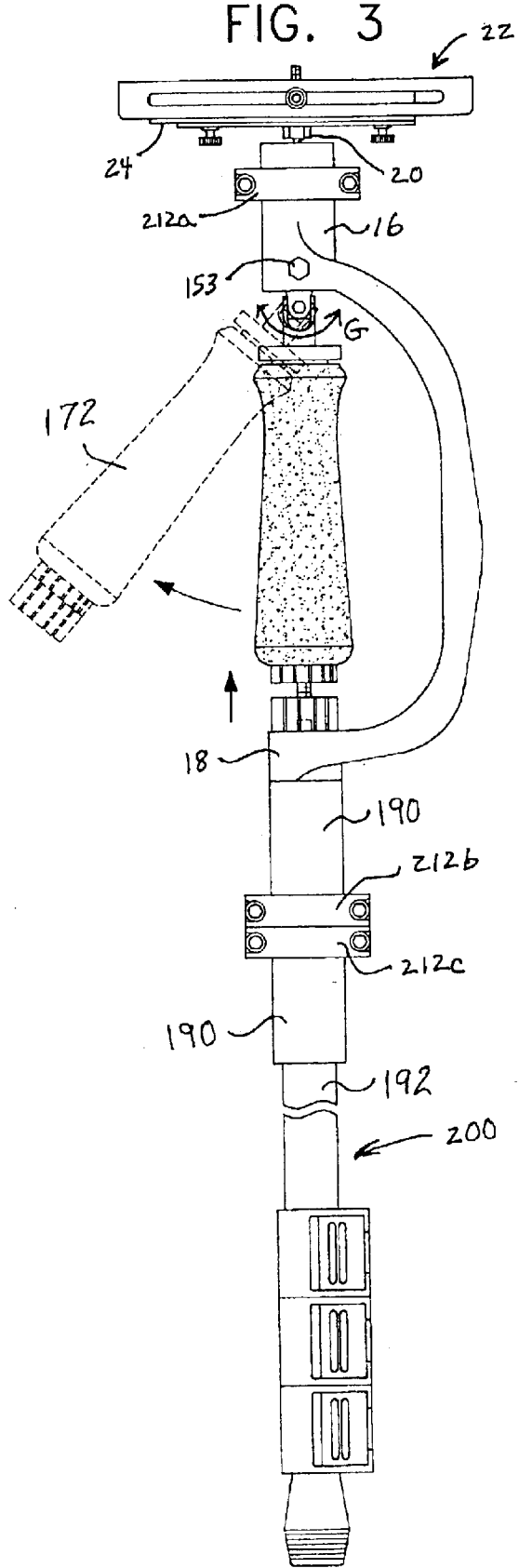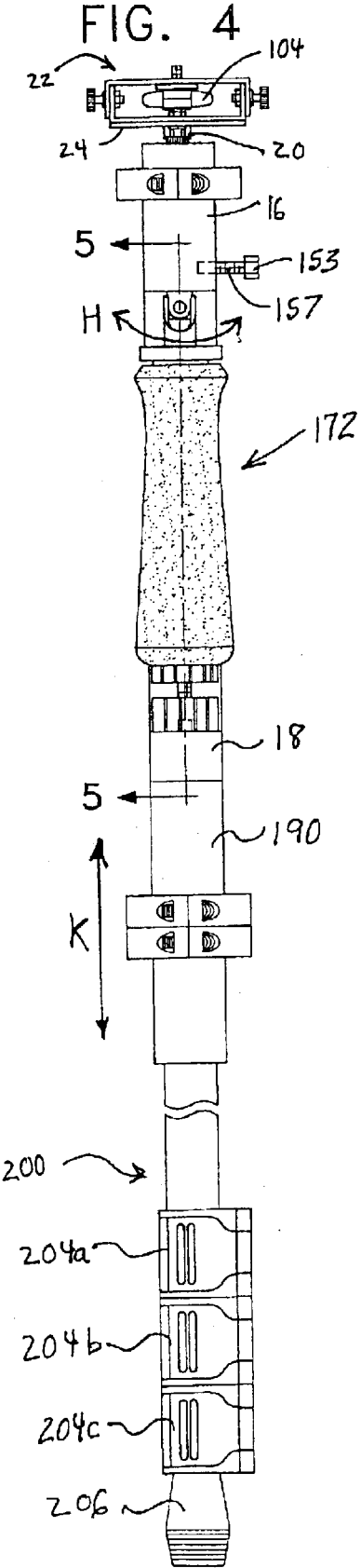

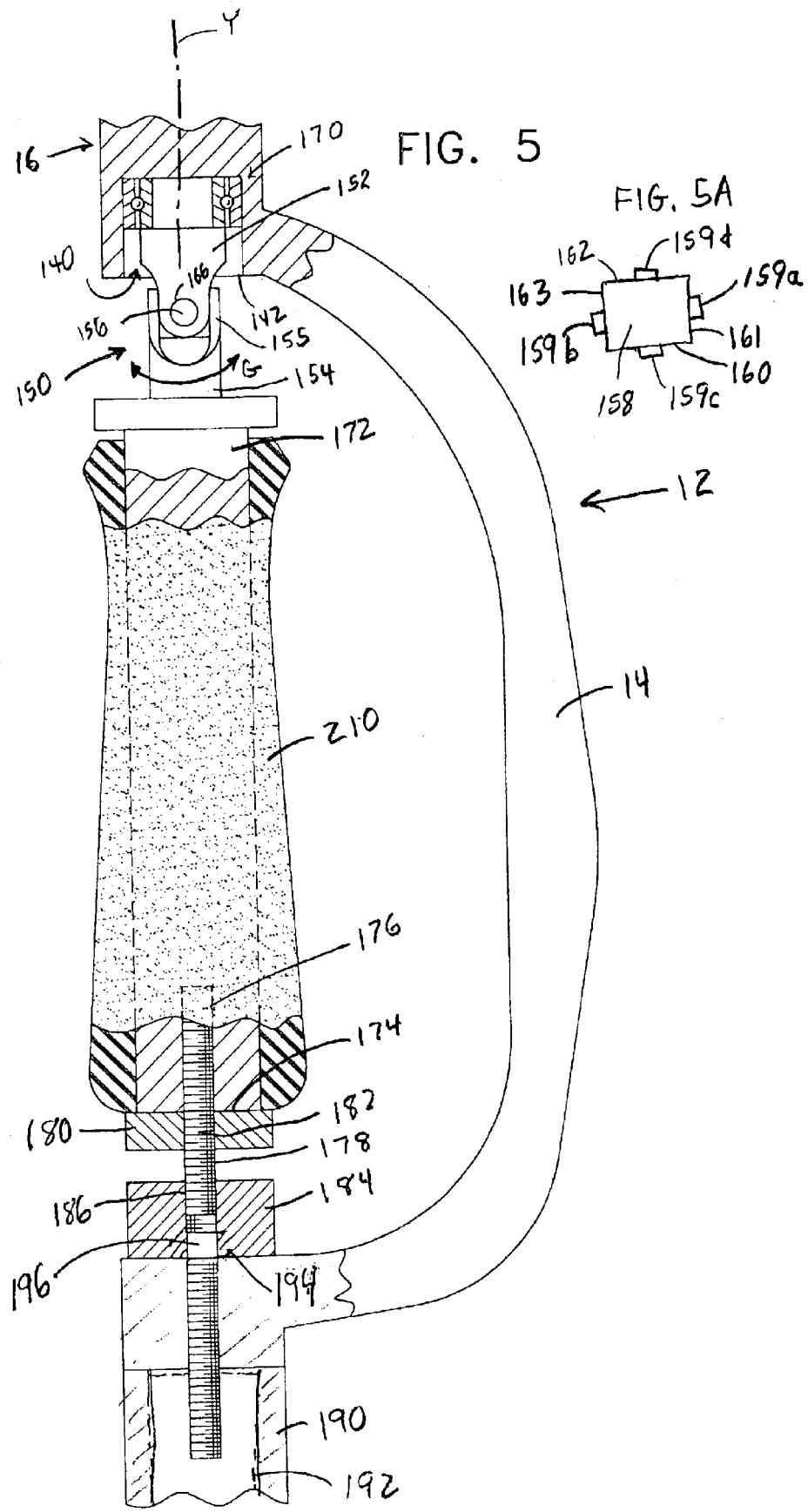

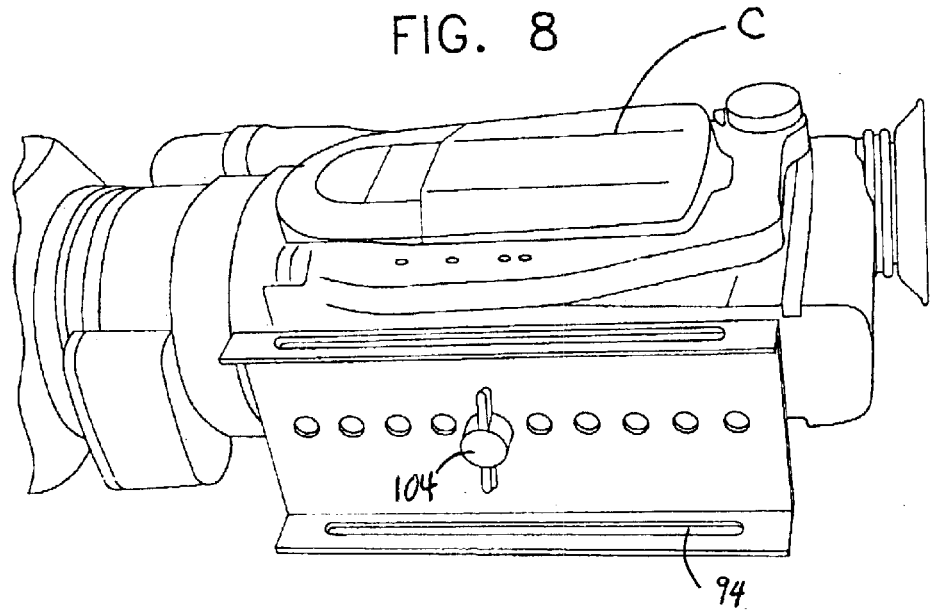
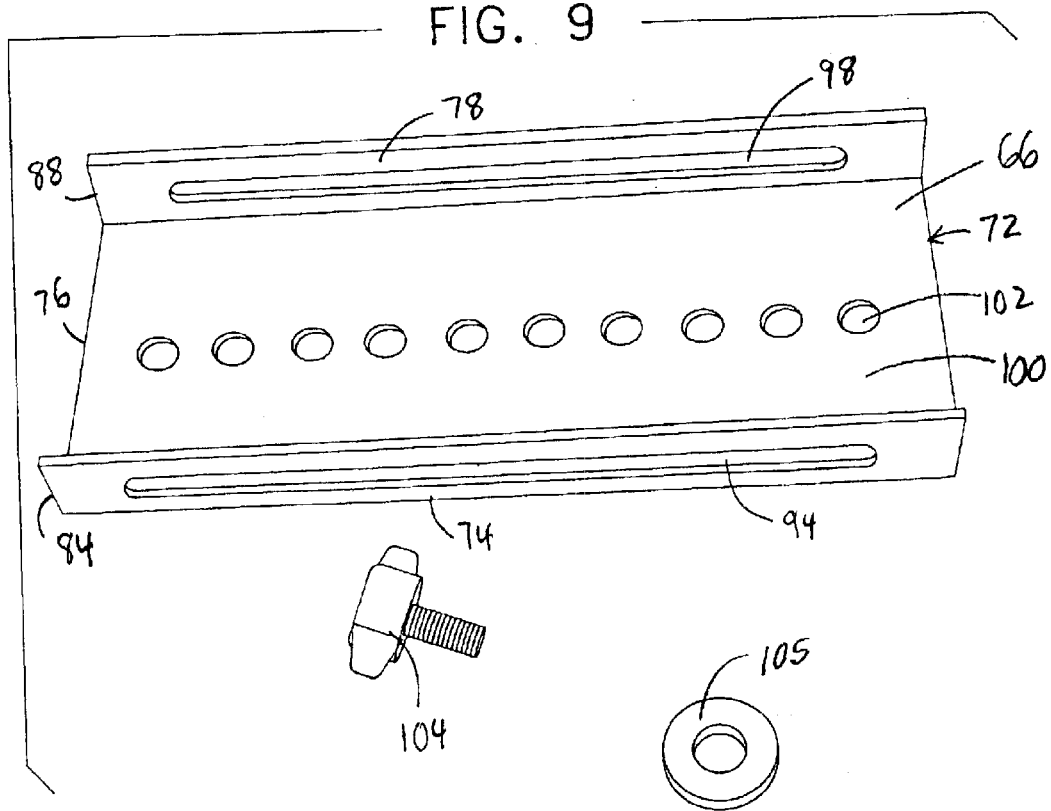

IMAGE STABILIZATION AND BALANCING SYSTEM

FIELD OF THE INVENTION

The present invention relates to the stabilization of video and film camera images recorded by the camera during shooting. In particular, the present invention relates to a system for use with a camera to balance a camera during shooting so that the resulting images recorded by the camera are stable to the viewer when the images are projected on a screen, in the case of film, or on a display, in the case of video.

BACKGROUND OF THE INVENTION

The present invention is not to be confused with internal mechanical and electrical stabilization systems mostly found in video cameras. These stabilization systems rely on mechanical and electrical adjustments within the camera to compensate for movement of the camera during shooting.

One prior art device, known as Glidecam 2000 Pro, is a lightweight, hand-held, camcorder stabilizing system, which allows a cameraman to shoot smooth shots even while going to extremes like running up and down stairs or traveling over rugged terrain.

The Glidecam 2000 Pro has an offset handle grip attached to a free floating Gimbal, which allows the user's hand to move up and down, and side to side, thereby isolating the user's hands from unwanted motions from the camera.

A camera platform moves back and forth, and side to side, to allow adjustment of the cameras horizontal balance. By varying the amount of counterweight disks on a base platform the camera's vertical balance can be adjusted.

The Glidecam 2000 Pro supports any camcorder or movie camera weighing up to 6 pounds. A small LCD monitor can be attached to a base monitor mount hole provided on the Glidecam 2000 Pro.

Another prior art device is known as Steadicam JR and is manufactured and distributed by The Tiffen Company. Steadicam JR is a compact, personal Steadicam for lightweight Compact VHS, Super VHS-C, 8 mm, Hi8, Super Hi8 and Mini DV camcorders weighing up to 4 pounds. Structurally, the Steadicam JR is similar to the Glidecam 2000 Pro and is made up of a camera platform, a gimbal handle, a flat screen monitor and two folding arms. The heart of the Steadicam JR is a stabilization concept that uses weights and balances, which places the center of gravity within its free-floating, inter-gimbaled handle assembly.

Finally, another device for stabilizing a camera during shooting is a conventional tripod or monopod. These devices provide three legs, in the case of a tripod, and one leg, in the case of a monopod, to touch the ground and provide a balance for a camera attached to the top of the tripod or monopod.

Although these devices perform their individual tasks well, there is a need for a device that embodies all of the best attributes of the stabilization devices and the monopod in a light, compact construction. The present invention is directed toward filling that need.

SUMMARY OF THE INVENTION

The stabilization device of the present invention centers on a main body part that consists of a generally C-shaped member terminating in a top tubular portion at the top of the C-shaped member and in a bottom tubular portion at the bottom of the C-shaped member. Secured to the top tubular portion is a threaded member to which is secured a camera mounting assembly.

The top tubular portion contains a hollow portion that is generally cylindrically shaped and extends upward from the bottom surface of the top tubular portion. The hollow portion is sized to receive a gimbal in the form of a device with two mutually perpendicular and intersecting axes of rotation, thus giving free angular movement in two directions.

Secured to the bottom tubular portion of the main body is an elongated hollow sleeve, which receives the top end of a monopod. The monopod has a conventional structure consisting of telescoping legs and complementary leg locks. The monopod terminates at its bottom end in a conventional foot used to obtain sure footing when the stabilization device is used in a monopod mode. The foot can also supply a spiked end to enhance placement of the monopod to the ground. The stabilization device has a series of detachable weights.

The operation of the stabilization device will now be described. The stabilization device has a series of detachable weights. Initially, a camera is mounted to the camera mounting assembly. Id this way, the camera-mounting platform moves for-and-aft and side-to-side to allow adjustment of the horizontal balance of the stabilization device The camera should now be balanced and the monopod should be positioned in a straight vertical line orientation.

Now the camera and monopod structure will be balanced. Initially, three balancing weights are secured about the sleeve. Also, the handle should be held at about a 45-degree angle. The weights are then moved up and down; eventually a point will be reached where the camera can right itself when tipped. Once balance has been reached, the camera can then be moved in any direction and, despite the thrusting movement, the camera will stay straight. For a small camera, one or more weights should be secured to the top tubular portion as part of the balancing process.

The stabilization device can also be used like a conventional monopod. This is accomplished by moving the handle into a vertical position. Rotation of a clearance member causes the handle to encompass a cap in order to fix the position of the handle, relative to the C-shaped member so that the stabilization device can be held by the handle while the monopod is extended to touch the ground. In this way the stabilization device can be used as a monopod.

The stabilization device can also be used for low camera shooting. In order to properly mount the camera, the present invention uses a rectangular frame that consists of a bottom portion, two side portions and top portion. Together these portions join to form a frame for receiving a camera. At the center of the top of the frame there is a threaded bore for receiving a threaded portion defined at the bottom of the monopod. In order to be able to follow the action when using the camera, an LCD screen is mounted to the top of the stabilization device. Finally, the stabilization device with the bottom frame and the camera is balanced in much the same way as when the camera is mounted to the top of the stabilization device.

BRIEF DESCRIPTION OF THE DRAWINGS

FIG. 3 is a right side view of a preferred embodiment of the present invention.

FIG. 4 is a rear view of the preferred embodiment of FIG. 3.

FIG. 5 is a view taken along lines 5—5 of FIG. 4.

FIG. 5A is a top view of a rectangular solid used in the gimbal for use in the present invention.

FIG. 8 is a bottom perspective view showing a camera mounted to a camera positioning plate forming part of the present invention.

FIG. 9 is a bottom perspective view of the camera positioning plate and winged bolt forming part of the present invention.

DETAILED DESCRIPTION OF THE PREFERRED EMBODIMENTS

Figure 1:
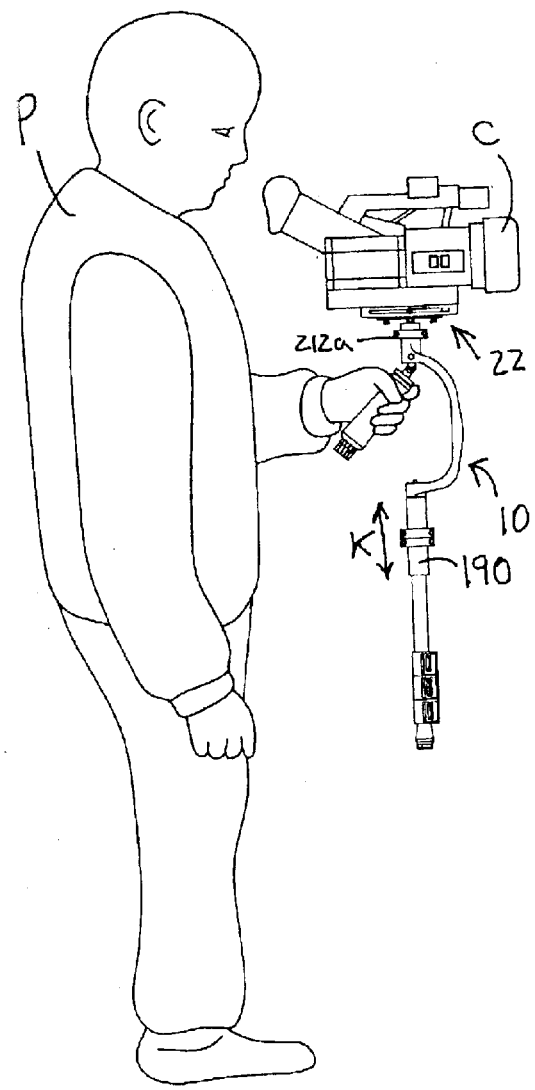
FIG. 1 is a plan view showing the present invention being used as stabilization device by a camera operator.

With reference to FIGS. 3 through 7, the construction of the present invention will be described. The stabilization device 10 centers around a main body part 12 that consists of a generally C-shaped member 14 terminating in a top tubular portion 16 at the top of the C-shaped member and in a bottom tubular portion 18 at the bottom of the C-shaped member. The top of tubular portion 16 has a threaded bore for receiving a threaded member 20 which forms part of a camera mounting assembly 22.

Figure 10:
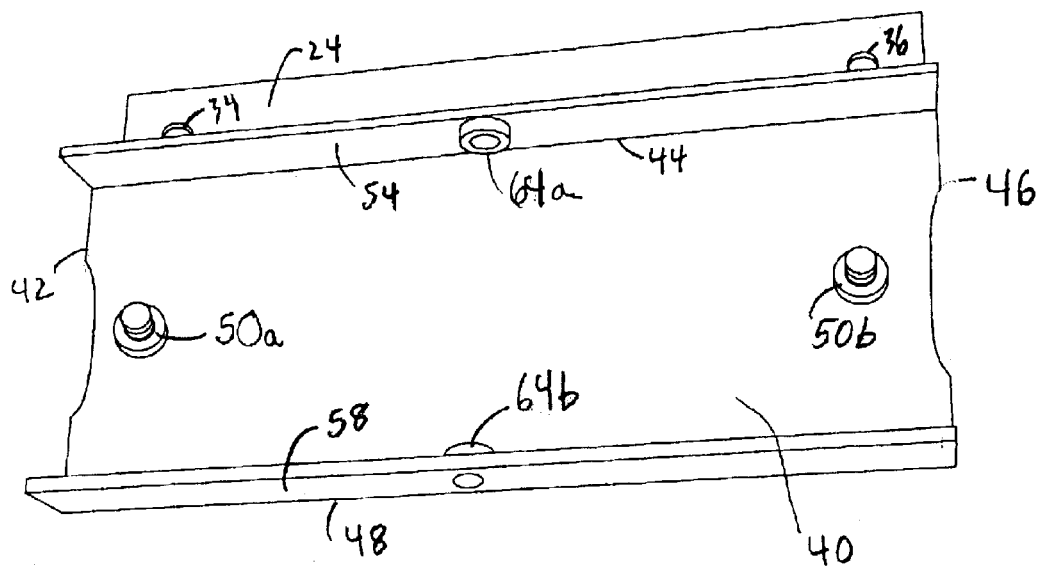
FIG. 10 is a top perspective view of a bottom positioning plate forming part of the present invention.
Figure 11:
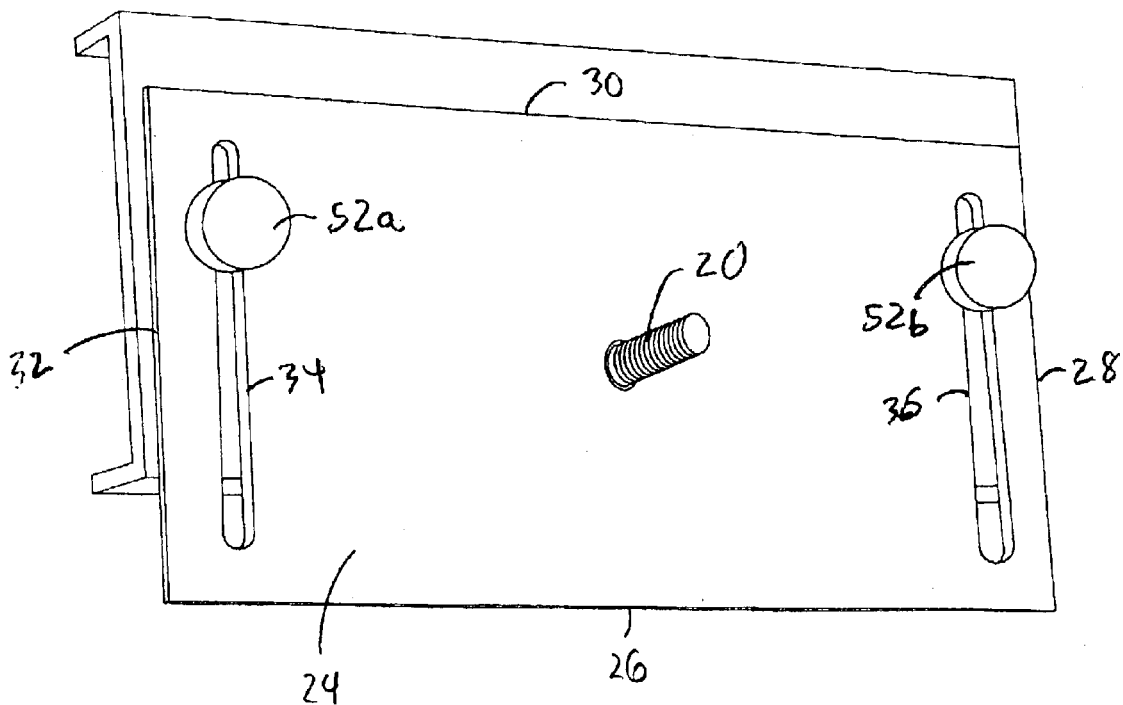
FIG. 11 is a bottom perspective view of a flat bottom plate forming part of the present invention.
Figure 12:
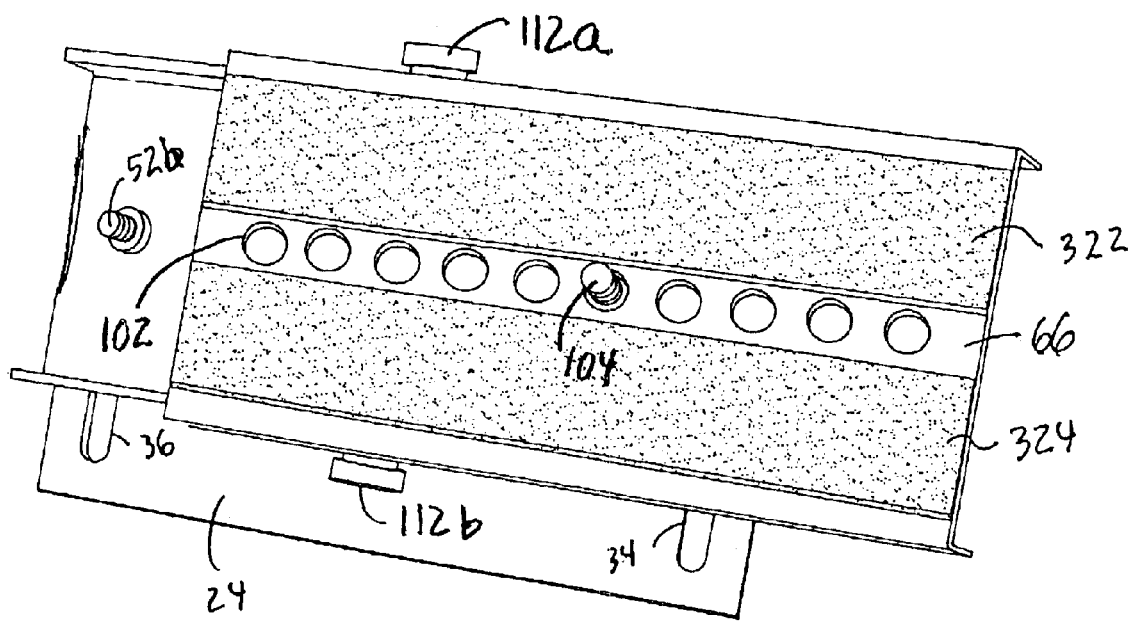
FIG. 12 is a top perspective view of the camera mounting assembly.
Figure 13:
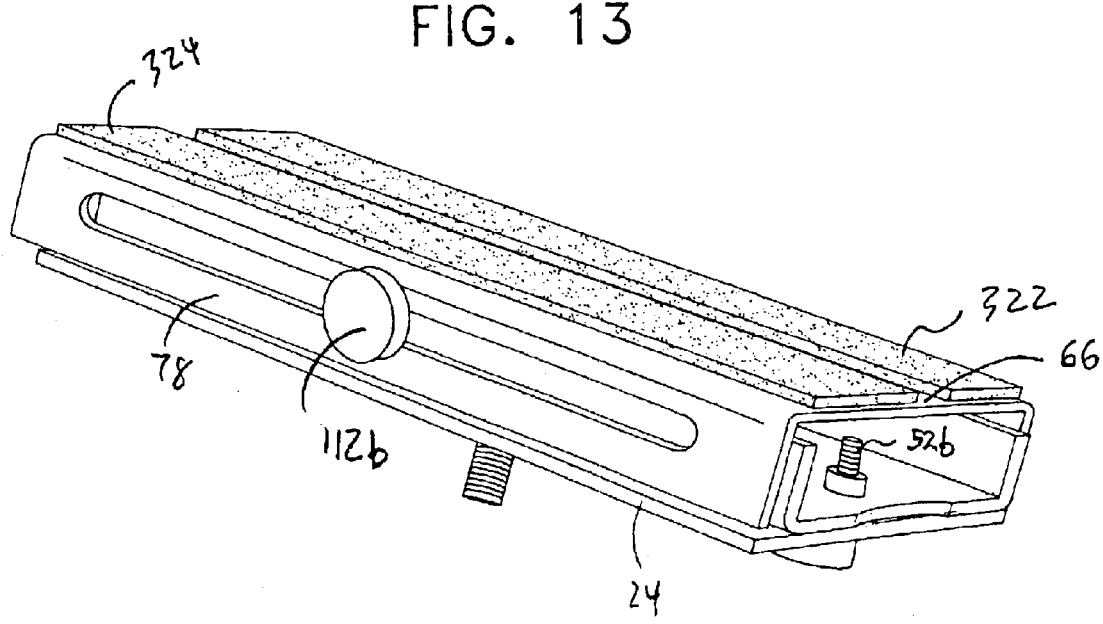
FIG. 13 is a side perspective view of the camera amounting assembly.

With particular reference to FIGS. 3, 4, and 7–13, the camera mounting assembly 22 is made up of a generally flat bottom plate 24 (FIG. 11) defined by a generally rectangular periphery of four edges: short edges 28 and 32, and long edges 26 and 32. Plate 24 also contains two elongated transverse slots 34 and 36. Slot 34 spans along and is parallel to the short edge 32 of plate 24. Slot 36 spans along and is parallel to the short edge 28 of plate 24. Also forming part of the camera mounting assembly is a bottom positioning plate 40 (FIG. 10). This plate 40 is generally rectangular shaped as defined by four edges: short edges 42 and 46, and long edges 44 and 48. Defined near the middle of each edge 42 and 46 of the bottom positioning plate 40 is a threaded bore 50a and 50b.

Bottom positioning plate 40 is placed on flat bottom plate 24 so that threaded bore 50a lines up in slot 34 and so that threaded bore 50b lines up in slot 36. Threaded pins 52a and 52b are screwed into corresponding threaded bores 50a and 50b after passing through slots 34 and 36 so as to movably secure bottom positioning plate 40 to bottom plate 24 so that plate 40 can move bi-directionally in opposing directions shown by arrows A and B in FIG. 7.

Long edges 44 and 48 each have a flange member 54 and 58, respectively. Each flange extends in a direction parallel to the associated edge and in a generally perpendicular direction relative to and away from the plane defined by the bottom positioning plate 40. Each flange 54 and 58 contains a threaded bore 64a and 64b, respectively.

Completing the camera mounting assembly is a top camera positioning plate 66 (FIGS. 7–9, 12 and 13). This plate is generally rectangularly shaped as defined by four edges: short edges 72 and 76 and long edges 74 and 78. Edges 74 and 78 each have a flange member 84 and 88 respectively. Each flange extends in a direction parallel to the associated edge and in a generally perpendicular direction relative to and away from the plane defined by the top positioning plate 66. Each flange 84 and 88 contains an elongated slot 94 and 98, respectively. The planar portion 100 of plate 66 has a plurality of spaced holes 102 arranged along the longitudinal axis of the camera positioning plate 66. The holes 102 provide a hole for receiving a winged threaded bolt 104 for mounting a camera C to the plate in a conventional manner. The particular hole 102 is selected to center the weight of the camera on the top camera positioning plate 66. A washer 105 is used to hold the winged bolt in place. Friction strips 322 and 324 are provided to further hold the camera in position when the camera is mounted to the camera mounting assembly.

Top camera positioning plate 66 is then positioned on the bottom positioning plate 40 so that slot 94 lines up with threaded bore 64a and slot 98 lines up with threaded bore 64b. Thus top camera positioning plate 66 is slidably mounted to bottom camera mounting plate 40 by threaded pins 112a and 112b so that the top camera positioning can move bi-directionally in the directions shown by arrows E and F in FIG. 7.

With reference to FIGS. 3–6 the rest of the stabilization device 10 will be described. Top tubular portion 16 contains an interior hollow portion 140 that is generally cylindrically shaped and extends upward and inward from the bottom surface. 142 of tubular portion 16. The hollow portion 140 is sized to receive a gimbal 150 in the form of a device with two mutually perpendicular and intersecting axes of rotation G and H, thus giving free angular movement in two directions. The gimbal is also free to rotate about an axis Y to provide universal movement.

With reference to FIG. 5, the gimbal 150 consists of two parts; top member 152 and bottom member 154. Each member is generally cylindrically shaped terminating at an end in a yoke formed of two yoke members 155 and 156. A gimbal core member is shown in FIG. 5A and consists of a rectangular solid 158 having a protrusion 159a–159d emanating from each face 160–163, respectively. Each pair of opposing protrusions 159a–159b and 159c–159d are rotatable positioned in opposed pairs of openings 166 in opposed pairs of yokes 155–156. In this way the gimbal can move in two perpendicular directions as evidenced by arrow G in FIG. 3 and arrow H in FIG. 4. Top member 152 is held in opening 140 by a bushing bearing combination 170. In this way, top member 152 is held in opening 140 by a bushing bearing combination 170. In this way, top member 152 is free to rotate about vertical axis Y. Threaded plastic screw 153 is received in threaded bore 157 and acts as a brake against top member 152 to limit its movement. Bottom member is secured to an elongated handle 172 by a convention means such as a screw (not shown).

The elongated handle has a bottom surface 174 that surrounds a threaded bore 176 which extends into the handle. A threaded headless screw 178 has one end screwed into bore 176. A tightening disk 180 has a central threaded bore for receiving screw 178. Finally a clearance member 184, through a central threaded bore 186, is screwed onto screw 178.

Secured to the bottom tubular portion 18 of the main body 12 is an elongated hollow sleeve 190, which receives the top end 192 of a monopod 200. The top end 192 is received in hollow sleeve 190 and is secured in the sleeve by a threaded pin 194 that terminates at its top end by a cap 196.

The monopod 200 has a conventional structure consisting of telescoping legs 202a–202d and complementary leg locks 204a–204c. The monopod terminates at its bottom end in a conventional rubber foot 206 used to obtain sure footing when the stabilization device is used in a monopod mode. The foot can be removed to reveal a threaded bore 312 (FIG. 15) to receive a threaded spike to enhance placement of the monopod on the ground or to receive a low-mode camera attachment as described later. The handle 172 has a conventional cushion covering 210 so that the stabilization device 12 can be comfortably held in a users hand.

Figure 6:
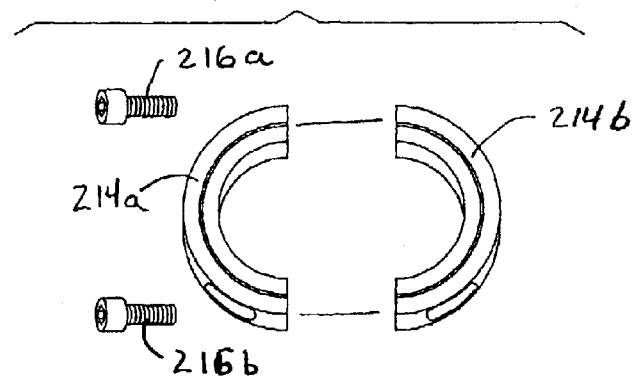
FIG. 6 is an exploded view of a balancing weight for use with the present invention.
Figure 7:
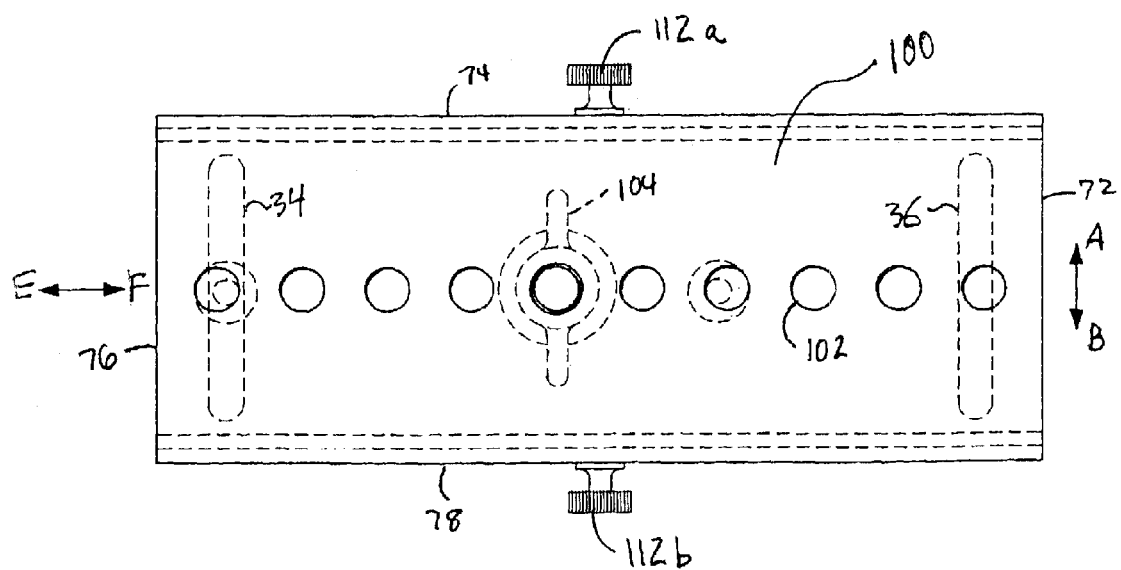
FIG. 7 is a top plan view of the preferred embodiment of FIG. 3.

The stabilization device 10 has a series of detachable weights 212a–212c. With reference to FIG. 6, the construction of one of the weights 212 will be described. Each weight consists of a pair of semicircular cuffs 214a and 214b. The cuffs are held together by conventional fasteners, such as screws 216a and 216b. As will be explained, the weights can be distributed on either of top portion 16 and sleeve 190 depending on the weight of the camera secured to the camera mounting assembly 22.

Figure 2:
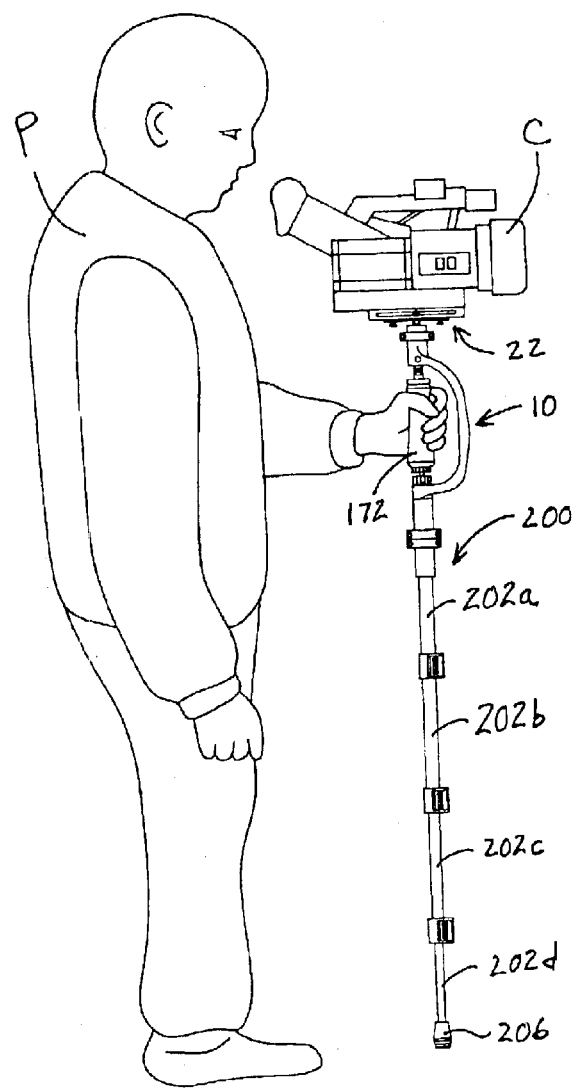
FIG. 2 is a plan view showing the present invention being used as a monopod.

With reference to FIGS. 1, 2 and 5, the operation of the stabilization device 12 by a camera operator P will now be described. Initially, the camera C needs to be mounted to the camera mounting assembly 22. Camera C is placed on the top of the platform 66 and is secured into position by the wing bolt 104 which has a threaded portion that screws into a conventional threaded bore defined in the camera C. The platform 66 is movably mounted to bottom positioning plate 40 and is movably secured thereto by threaded locking pins 112a and 112b. In turn, the bottom surface of positioning plate 40 is movably secured to the top surface of flat bottom plate 24 by locking pins 52a and 52b. Finally, the bottom plate. 24 is secured to the top tubular portion 16. In this way, the camera-mounting platform moves for-and-aft and side-to-side to allow adjustment of the horizontal balance of the stabilization device 12. The camera should now be balanced and the monopod should be positioned in a straight vertical line orientation when the handle 172 is held as shown in FIG. 1.

Now the camera and monopod structure will be balanced. Initially, three balancing weights 212a–212c are placed about the sleeve 190. Also, the handle 172 should be held by the operator P as shown in FIG. 1. The weights are then moved up and down in the directions shown by arrow line K, eventually a point will be reached where the camera C can right itself when tipped. Once balance has been reached, the camera can then be moved in any direction and, despite the thrusting movement, the camera will stay straight. For a small camera, one or more weights should be secured to the top tubular portion 16. See for example, FIG. 1 and weight 212a.

The stabilization device can also be used like a conventional monopod. This is accomplished by moving handle 172 into the position shown in Figs.2, 4 and 5. Initially, the clearance member 184 is rotated to move the clearance member upward toward the tightening disk 180 thus providing clearance for the end cap 196 when the handle 172 is moved from the position in FIG. 1 to the position in FIG. 2. With the handle 172 hovering over the end cap 196, clearance member 184 is rotated to move downward thereby causing the clearance member to surround and encompass cap 196 in order to fix the position of the handle 172, relative to the C-shaped member 14 so that the stabilization device can be held by handle 172 while the monopod is extended to touch the ground as shown in FIG. 2. In this way the stabilization device 10 can be used as a monopod.

Figure 14:
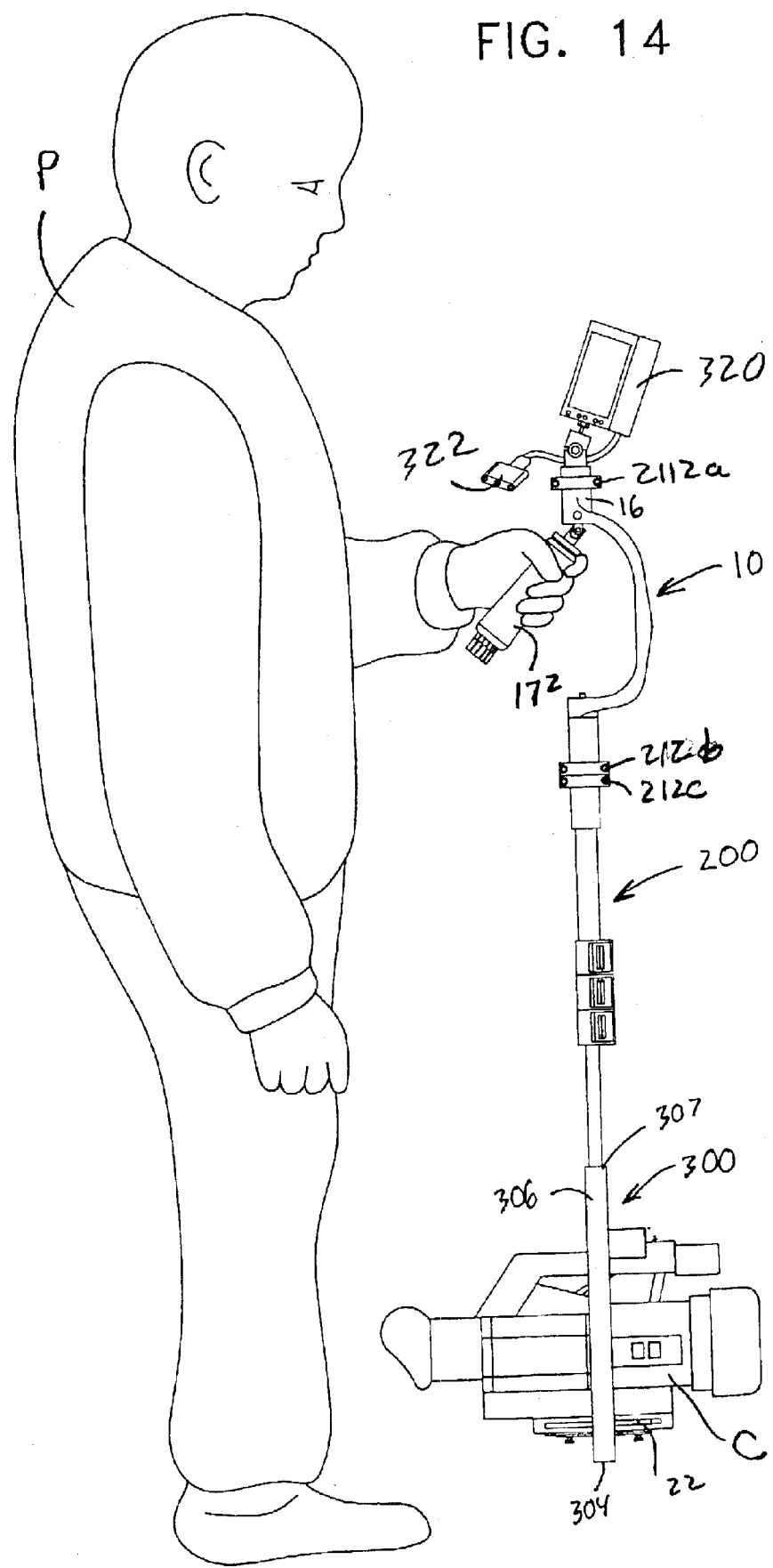
FIG. 14 is a plan view of the inventive stabilization device used with a bottom camera mounting assembly.
Figure 15:
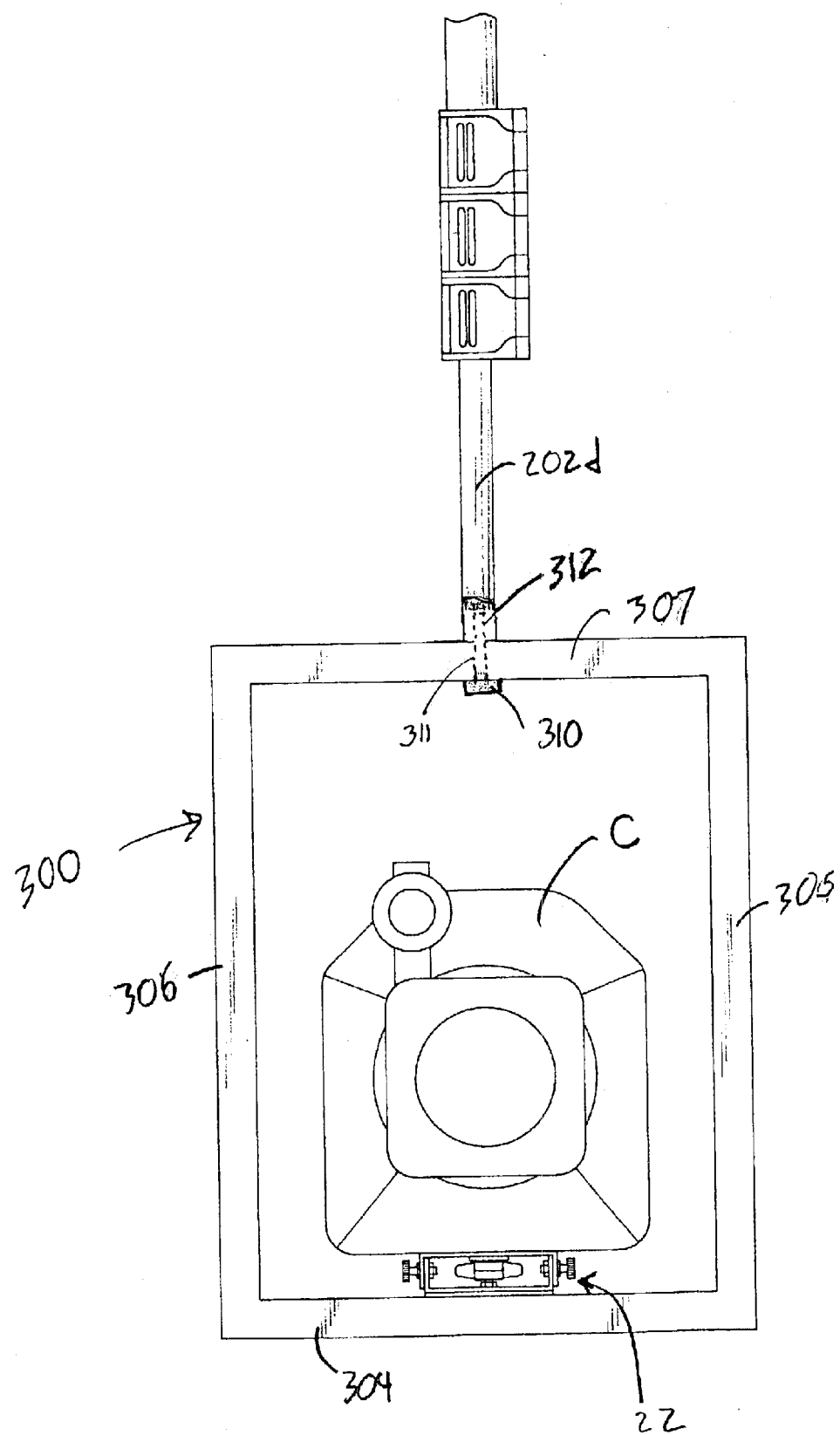
FIG. 15 is a plan front view of the bottom camera mounting assembly of FIG. 14.

With reference to FIGS. 14 and 15, the use of the stabilization device for low camera shooting will be described. Sometimes a camera operator P would like to take a low level shot. Normally this is accomplished by the operator lying on or near the ground to hold the camera at the proper position. With the present invention, this can be accomplished with the inventive stabilization device.

In order to properly mount the camera, the present invention uses a rectangular frame that consists of a bottom stick portion 304, two side stick portions 305 and 306 and a top stick portion 307. Together these portions join to form frame 304 for receiving camera C. The camera mounting assembly 22 is secured to bottom portion 304 through a suitable fastener such as a screw (not shown) so that the camera may be mounted within the frame. At the center of the top stick 307 of the frame.304 there is a threaded bolt 310 which passes through a cylindrical bore 311 in top stick 307 and into threaded portion 312 defined at the bottom of bottom leg 202d of the monopod 200.

In order to be able to follow the action when using the camera, an LCD screen is mounted to the top of the stabilization device 10. The LCD screen contains a plug 320 for connecting the D LCD screen to the video output of the camera C so that the image to be recorded is shown in the LCD screen.

The stabilization device 10 with the bottom frame 304 and camera C is balanced in much the same way as when the camera is mounted to the top of the stabilization device. First, the camera C is centered on the frame by being mounted to the camera mounting assembly 22 as described before so that the monopod is vertically oriented when the stabilization device is held by the handle 172 as shown in FIG. 14. The weights 212 are then adjusted up and down on tubular pieces 16 and 190. Eventually a point will be reached where the camera C can right itself when tipped. Once balance has been reached, the camera can then be moved in any direction and, despite the thrusting movement, the camera will stay straight. Also, because most of the weight is in the camera, additional weights 212 will have to be added to the tubular portion 16 and 190.

While the invention has been described in terms of certain embodiments, it is not intended that the invention be limited to the above description, but rather only to the extent set forth in the claims. For example, the stabilization device-can be used in its balancing mode with or without the monopod 200. If the monopod is removed, then the weights 212a–212c will have to be adjusted up or down the tubular sleeve 190. Also, with the handle 172 in the secured position, the monopod can be removed, and the remainder of the stabilization device 10 can be used as a standard handle to hold the camera during shooting. The weights 212a–212c can be removed to lighten the device 10 during shooting.

What is claimed is:

1. An image stabilization system for use with a camera by a camera operator, said system comprising:

a body member having top and bottom ends, the top end containing a top portion and the bottom end containing a bottom portion;

an extendable monopod having first and second ends;

the first end of the monopod being attached to the bottom portion of the body member;

a camera mounting plate, the mounting plate being secured to the body member;

a handle member, the handle member being secured to the body member; and balancing weights secured to at least one of the body member and the monopod and adjustable on the at least one body member and monopod so that when a camera is mounted on the mounting plate and the system is held by the handle member by the camera operator, the camera stays in a stable position during use of the camera.

2. The image stabilization system of claim 1, wherein the camera mounting plate is secured to the top portion and the handle member has first and second ends with the first end being secured to the top portion.

3. The image stabilization system of claim 2, wherein the second end of the handle member has a securing device for securing the second end to the bottom portion of the body member and the monopod is made up of a plurality of extensible sections arranged in a telescoping manner so that the monopod can be used in a conventional manner when the system is held by the secured handle member.

4. The image stabilization system of claim 2, wherein the second end of the handle member has a securing device for securing the second end to the bottom portion of the body member and the monopod is removably mounted so that the handle member may be held by the camera operator to balance the camera when the monopod is removed from the bottom portion.

5. The image stabilization system of claim 4, wherein the camera is still balanced even with removal of the balancing weights.

6. An image stabilization system for use with a camera by a camera operator, said system comprising:

a body member having a generally C-shape with a first end at one end of the C-shape and a second end at the other end of the C-shape with a top portion at the first end of the C-shape and a bottom portion at the second end of the C-shape;

a monopod having first and second ends, the monopod made up of a plurality of elongated sections arranged in a telescopic manner to extend the length of the monopod from a first length to a second length, with the second length being longer than the first length;

the first end of the monopod being slidably attached to the bottom portion of the body member;

an adjustable camera mounting plate, the mounting plate being secured to the body member, an elongated handle member having a first end and a second end;

a universal joint for movably securing the first end of the handle member to the body member so that the handle member is movable in all directions; and balancing weights movably secured to at least one of the body member and the monopod and adjustable along the at least one body member and monopod so that when a camera is mounted on the mounting plate and the system is held by the handle member by the camera operator, the camera stays in a stable position during use of the camera.

7. An image stabilization system for use with a camera by a camera operator, said system comprising:

a body member;

an extendable monopod having a top end and a bottom end;

a camera-mounting frame secured to the bottom end of the monopod;

the top end of the monopod being attached to the body member;

a camera mounting plate, the camera-mounting plate being secured within the camera mounting frame;

a handle member, the handle member being secured to the body member; and balancing weights secured to at least one of the body member and the monopod and adjustable on the at least one body member and monopod so that when a camera is mounted on the camera-mounting plate and the system is held by the handle member by the camera operator, the camera stays in a stable position during use of the camera.

8. The stabilization system of claim 7, wherein the camera-mounting frame comprises a top stick portion, two side stick portions and a bottom stick portion joined to form a generally rectangular frame.

9. The stabilization system of claim 8, wherein the camera-mounting plate is secured to the bottom stick portion.

10. The stabilization system of claim 7, wherein the handle member has first and second ends with the first end being secured to the top portion.

11. The image stabilization system of claim 10, wherein the second end of the device for securing the second end to the bottom portion of the body member so that the handle member may be held by the camera operator to hand balance the camera that is mounted within the camera-mounting frame.

* * * * *